United States Patent
Zoellin et al.

(10) Patent No.: US 10,983,797 B2
(45) Date of Patent: Apr. 20, 2021

(54) PROGRAM INSTRUCTION SCHEDULING

(71) Applicant: International Business Machines Corporation, Armonk, NY (US)

(72) Inventors: Christian Zoellin, Austin, TX (US); Phillip G. Williams, Austin, TX (US); Brian W. Thompto, Austin, TX (US); Dung Q. Nguyen, Austin, TX (US); Hung Q. Le, Austin, TX (US); Jessica Hui-Chun Tseng, Fremont, CA (US); Jose E. Moreira, Irvington, NY (US); Sheldon Bernard Levenstein, Austin, TX (US); Sundeep Chadha, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/423,290

(22) Filed: May 28, 2019

(65) Prior Publication Data
US 2020/0379766 A1 Dec. 3, 2020

(51) Int. Cl.
*G06F 9/38* (2018.01)

(52) U.S. Cl.
CPC .......... *G06F 9/3838* (2013.01); *G06F 9/3855* (2013.01)

(58) Field of Classification Search
CPC .............................. G06F 9/3855; G06F 9/3838
See application file for complete search history.

(56) References Cited

U.S. PATENT DOCUMENTS

| | | | | |
|---|---|---|---|---|
| 4,847,755 A * | 7/1989 | Morrison | ................ | G06F 8/445 712/203 |
| 5,918,005 A * | 6/1999 | Moreno | ................ | G06F 9/3834 712/E9.048 |
| 6,553,480 B1 * | 4/2003 | Cheong | ................ | G06F 9/3836 712/23 |
| 6,654,869 B1 * | 11/2003 | Kahle | ................ | G06F 9/382 712/209 |
| 6,889,318 B1 * | 5/2005 | Wichman | ................ | G06F 9/3853 712/226 |
| 7,836,282 B2 * | 11/2010 | Ban | ................ | G06F 9/3857 712/226 |
| 10,019,263 B2 | 7/2018 | Kbdallah | | |
| 10,055,256 B2 | 8/2018 | Winkel et al. | | |
| 2012/0278593 A1 * | 11/2012 | Clark | ................ | G06F 9/3851 712/215 |
| 2017/0168833 A1 * | 6/2017 | Mericas | ................ | G06F 11/30 |

FOREIGN PATENT DOCUMENTS

| | | |
|---|---|---|
| EP | 2887181 B1 | 8/2018 |
| WO | 2018111228 A1 | 6/2018 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

*Primary Examiner* — Farley Abad

(74) *Attorney, Agent, or Firm* — David K. Mattheis; William H. Hartwell; Nicholas L. Cadmus

(57) ABSTRACT

Processor instruction scheduling by: providing a set of program instructions, selecting instructions for reordering from the set of program instructions, reordering the instructions according to instruction properties, assigning sequential instruction tags to the instructions, tagging the instructions for completion as a group in a completion table; and executing the instructions.

17 Claims, 4 Drawing Sheets

PROGRAM INSTRUCTION SCHEDULING

BACKGROUND

The disclosure relates generally to scheduling and executing processor instructions to improve processor performance in terms of time and energy consumption, and specifically to dynamically reordering processor instructions for processor execution.

Program instructions are typically written in an order which supports the logic of the program. System resources review and process instructions using algorithms designed to efficiently utilize system resources. The algorithms may process the instructions in program order, or out of program order, depending upon the algorithm, the instructions, and available system resources.

At run time, a block of instructions may be loaded in memory. The block may be pre-decoded, and information associated with executing the instructions may be added to the instructions. Branching instructions may be identified and relevant register addresses may be added to the instructions at the pre-decode step for use at the decode step. The instructions may then be fetched, decoded, reordered, executed, and completed.

SUMMARY

Aspects of the invention disclose methods, systems and computer readable media associated with processor instruction execution by providing a set of program instructions, selecting instructions for reordering from the set of program instructions, reordering the instructions according to instruction properties, assigning sequential ITAGs (instruction tags) to the instructions, tagging the instructions as a group in a completion table; and executing the instructions.

DETAILED DESCRIPTION

Figure 1:
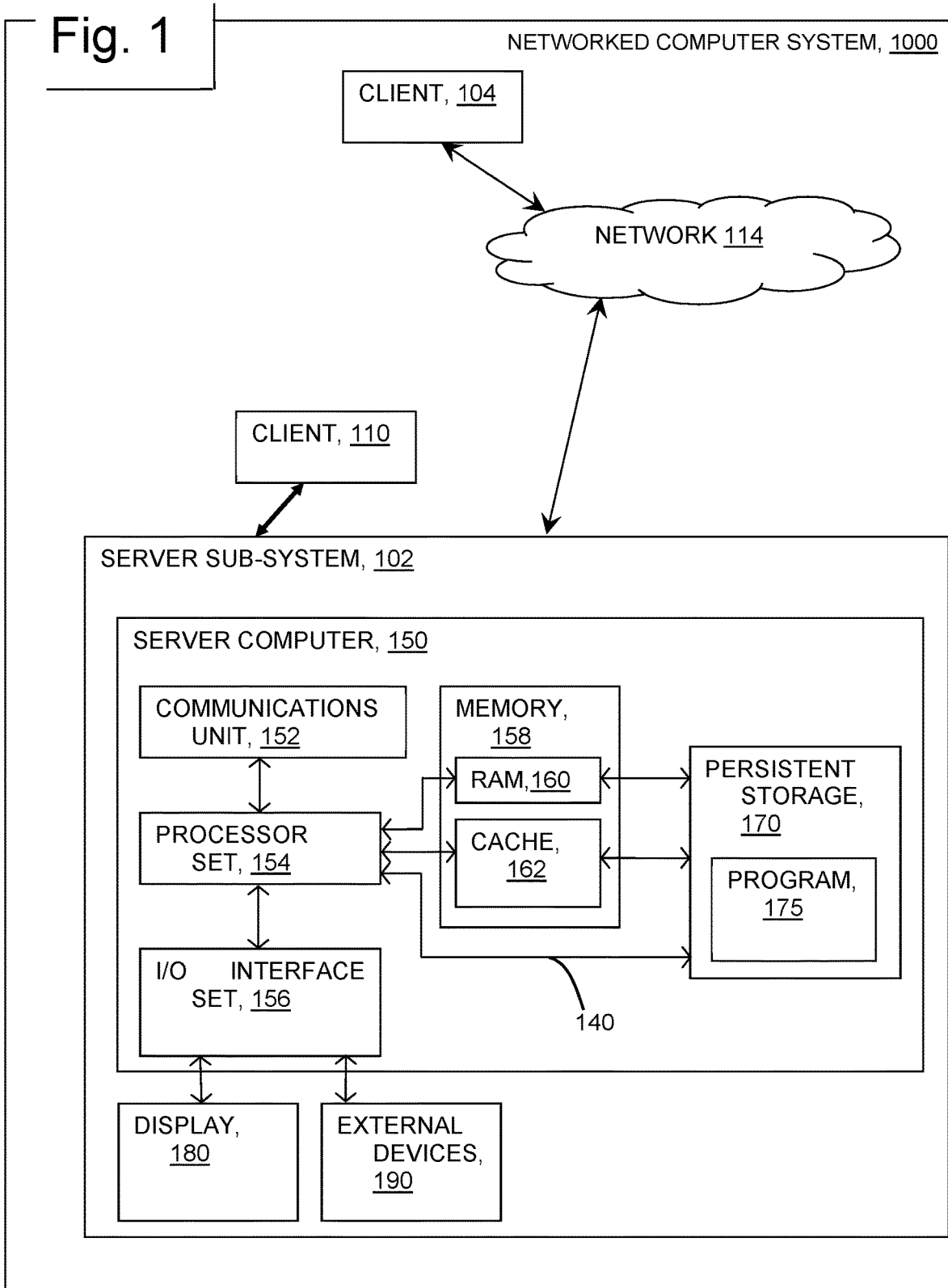
FIG. 1 provides a schematic illustration of system components, according to an embodiment of the invention.

The time, computing resources and energy required for the execution of a computer program by a computer processor depends upon the time, computing resources and energy required to execute the individual instructions of the program and the manner in which those instructions are executed. The order of the instructions may create temporal latencies which increase the overall amount of time necessary for the execution of the program. Each instruction requires energy for execution and the overall energy required to execute the program is the sum of the energy required for the set of program instructions to be executed. In an embodiment, selectively reordering and appropriately fusing instructions prior to fetching, decoding, and execution may reduce the time and energy needed to execute the program.

Blocks of processor instructions may be reordered or fused after decoding depending upon the system resources associated with executing the respective instructions. Instructions for which all necessary resources are available may be executed out of program order to increase execution efficiency. Instructions having co-execution opportunities may be grouped together to allow co-execution using the same system resources. Instructions having source-destination dependencies may be fused to execute faster, reducing overall program latency. Reordering and fusion after decoding are typically applicable to instructions which are adjacent in program order. Decoders may lack any capacity to account for intervening instructions between instructions which may benefit from fusion or reordering. What is desired is a way to apply reordering and fusion to a greater set of the original program ordered instructions.

In an embodiment, a block of instructions is provided and loaded into memory. The block is loaded into cache memory from the next higher memory in the hierarchy. In an embodiment, a block of 32 instructions are loaded and analyzed as a set. Other block sizes may also be loaded. The block of program instructions is pre-decoded for analysis. In an embodiment, the analysis is performed by the processor system management controller. The analysis considers instruction properties including co-execution opportunities, source-destination dependencies as well as downstream structure requirements of the instructions, individually and in combination.

In an embodiment, the analysis may indicate that the original instruction order, or a reordering of the instructions, results in adjacent instructions which may either be fused to reduce latency in what would otherwise be back to back execution of the instructions. In an embodiment, the analysis may indicate that reordering the instructions may yield a set wherein adjacent instructions may be dispatched to the same downstream structures such as queues and renames to increase processor pipeline efficiency. The analysis results in the selection of instructions for reordering and/or fusion.

In an embodiment, the set of 32 instructions in the block are evaluated in groups of four sequential instructions. As an example, four sequential instructions, A, B, C, and D, from the loaded block of 32 are analyzed to determine if instruction reordering may be beneficial. The analysis may reveal that reordering the instructions from A-B-C-D to A-C-B-D, would enable the fusion of instructions A and C after decoding has occurred. In this embodiment, sequential instruction tags (ITAGs) may be assigned to the four instructions indicating the new order for execution. Additional information may be added to the set of tags further indicating that instructions A and C may be fused.

As an example, the program ordered instructions may include three instructions: add RT, RA, RB; sub RX, RY, RZ; add RT, RT, RC. Analysis of these instructions indicates that reordering the instructions as: add RT, RA, RB; add RT, RT, RC; sub RX, RY, RZ, enables the two add instructions to be fused, reducing the latency of the overall execution by diminishing the number of clock cycles necessary to execute the two instructions. In an embodiment, the program order of the instructions may be maintained while additional information is added to the instructions in the form of new ITAGs indicating the new executional order as well as additional information indicating that the set should be reordered and the two add instructions of the new order should be fused.

In an embodiment including multiplication, the program instructions may include: mulld RT, RA, RB (to get the 64 low-order bits of a multiplication result) and mulhd RX, RA, RB (to get the 64 high-order bits of the result). Fusing these instructions and returning the entire 128 bit result from a single action will reduce the number of multiplications, which are energy intensive, thereby reducing the energy utilization of the overall program. In this embodiment, the additional information would indicate that the two instructions may be fused, as well as indicating that any intervening instructions should be reordered to result in the two multiplication instructions being adjacent. Absent the additional information and reordering to shift the intervening instructions the decoder may not recognize the opportunity to fuse the instructions.

In an embodiment, reordering instructions to render two load instructions having the same base register adjacent (LD 32(A), LD40(A), where A is the base register of a load of 8 bytes and 32 and 40 are displacements) enables the fusion of the two load instructions after the decoder.

In an embodiment, the additional information may have a value ranging from 0 to 3. In this embodiment, a value of 0 indicates that no reordering of the instructions is needed, A-B-C-D, remains A-B-C-D; 1, indicates that no reordering is needed but that instructions A and B, may be fused; 2, indicates that the instructions A-B-C-D should be reordered as A-C-B-D, and that instructions A and C may be fused; 3, indicates that the instructions should be reordered as A-D-B-C, and that instructions A and D may be fused. This additional information is read by the decoder after the instructions are fetched and acted upon accordingly to reorder and fuse the instructions.

In an embodiment, after the pre-decoding, analysis and addition of information, the instructions may be fetched from the cache, decoded into the corresponding set of micro operations, reordered and fused according to the additional information added after the pre-decoding analysis, dispatched to the instruction sequencing unit with new sequential ITAGs indicating the reordering, renamed, and executed. In this embodiment, prior to dispatch and execution, the set of instructions are tagged and marked as atomic for completion, or retirement, in the completion table, indicating that all instructions in the set must complete, or be retired. together or none of the instructions in the set will be considered complete, or retired.

As the instructions finish, the completion table is updated indicating the status of each instruction. When all of the set of instructions are finished, the set as whole is complete and the processor fetches the next set of four instructions from the block of 32 which have been pre-decoded and had additional information regarding reordering and fusion added to them. When one or more of the set of four instructions fails to complete and triggers an exception, the entire set fails to complete. As the group of instructions have been reordered and possibly fused, identifying which instruction of the modified group triggered the exception may not be possible. In this instance, the processor re-fetches the full set of four instructions for decoding, dispatch, renaming and execution without regard to the additional information from the pre-decode analysis. In this way, instructions A-B-C-D, are executed in the original program order to determine which instruction triggered the exception.

In an embodiment, the loading and analysis of the blocks of instructions may occur according to fixed non-overlapping views of the instructions, or a sliding window view moving upon the instruction set. In this embodiment, a fixed window would provide the analysis of instructions A-B-C-D, followed by loading and analyzing instructions E-F-G-H. A sliding window approach provides the analysis of A-B-C-D, followed by the loading and analysis of B-C-D-E, and so on.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise vehicle-access program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, including cache 160 and random-access memory (RAM)160, persistent storage 170, communications unit 152, input/output (I/O) interface(s) 156 and communications fabric 140. Communications fabric 140 provides communications between memory 158, including RAM 160 and cache 162, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the instruction sequencing program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, 106, 108, 110, and 112. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., instruction sequencing program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
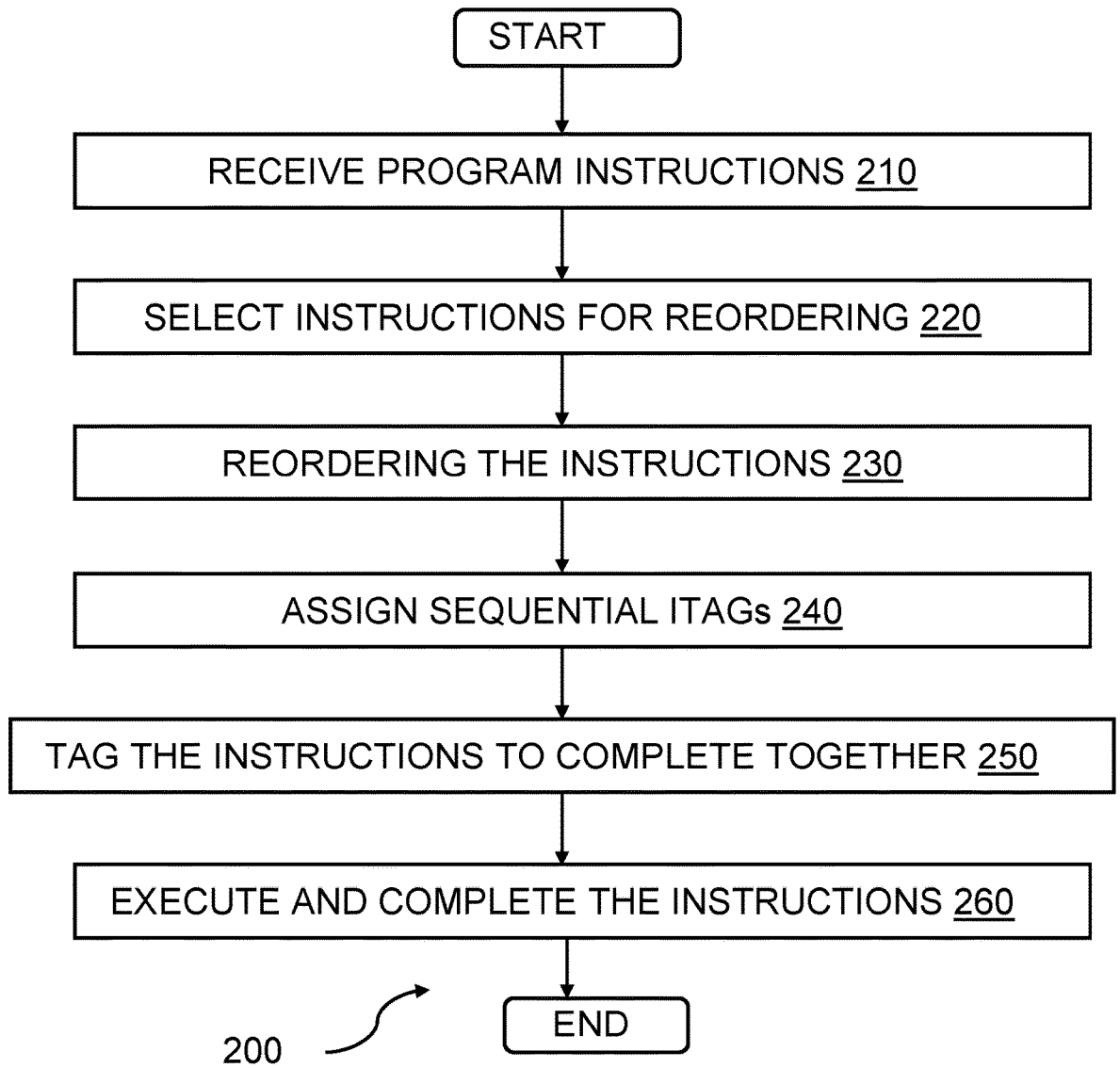
FIG. 2 provides a flowchart depicting the logical execution of steps, according to an embodiment of the invention.

FIG. 2 provides a flowchart 200, illustrating exemplary activities associated with the practice of the disclosure. After program start, a first set of program instructions is received at 210. The instructions may be loaded from a next higher-level memory in the hierarchy into a cache as a block. In an embodiment, the block comprises 32 instructions. One of ordinary skill in the relevant arts would appreciate that the invention may be practiced using blocks having more or fewer than 32 instructions. The received instructions are pre-decoded and analyzed. In an embodiment, the instructions are pre-decoded and analyzed in groups of four. One of skill in the art will appreciates that other group sizes may be practiced. The groups may be non-overlapping sequential groups of four, or sequential overlapping groups of four from a sliding window review of the block of 32 instructions. Instructions are selected for reordering at 220. The selected instructions are reordered at step 230, and new sequential ITAGs are assigned to the reordered instructions at 240. The instructions may be saved in the original program order incorporating the new ITAGs as additional information together with information for the decoder regarding actions to be taken on the selected instructions. The selected instructions are tagged as a group for completion together, at 250. The selected instructions are then fetched, decoded, reordered according to the additional information, dispatched, executed and completed at 260. Instruction groups which fail to complete together are re-fetched and executed without reordering.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
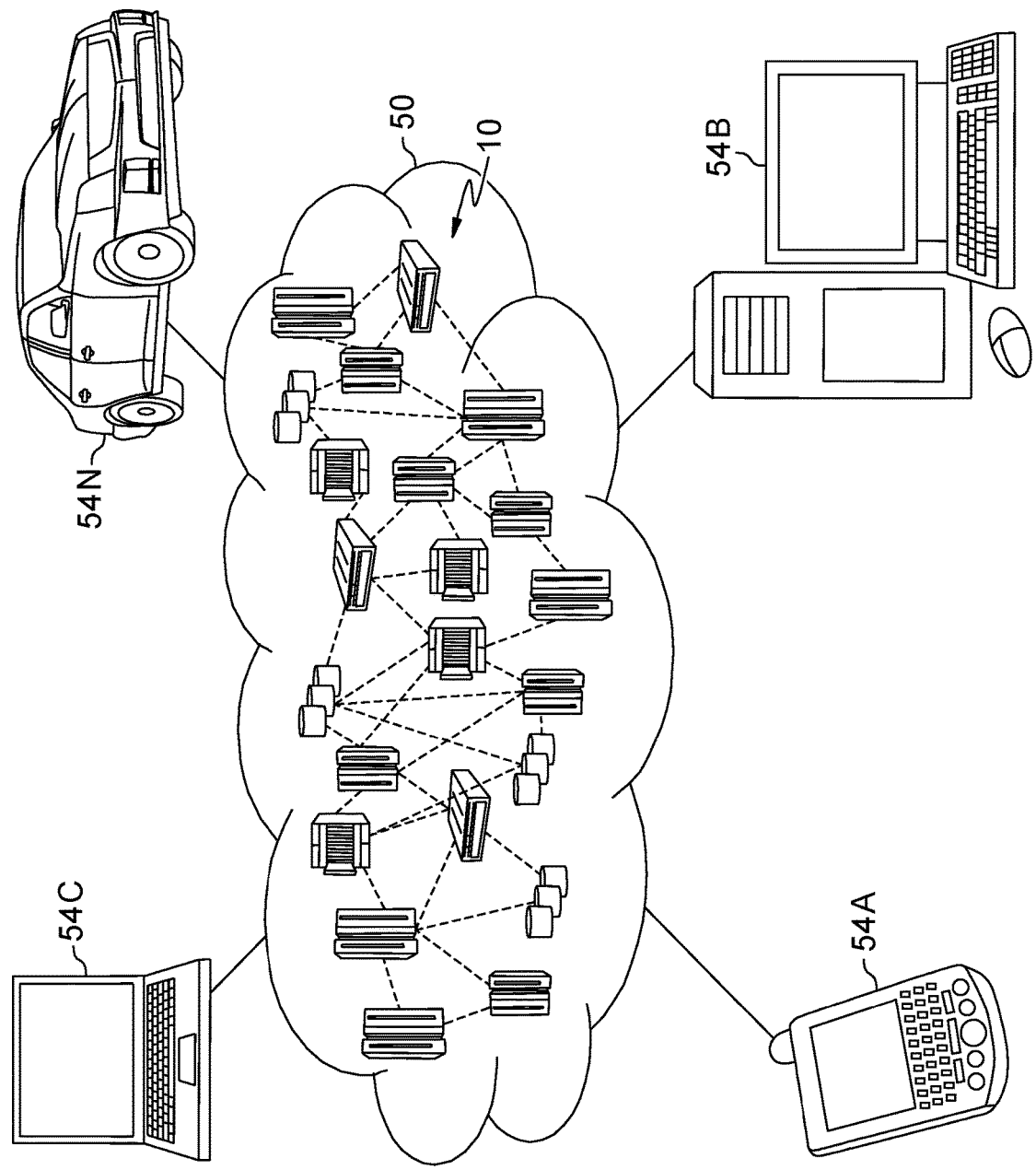
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
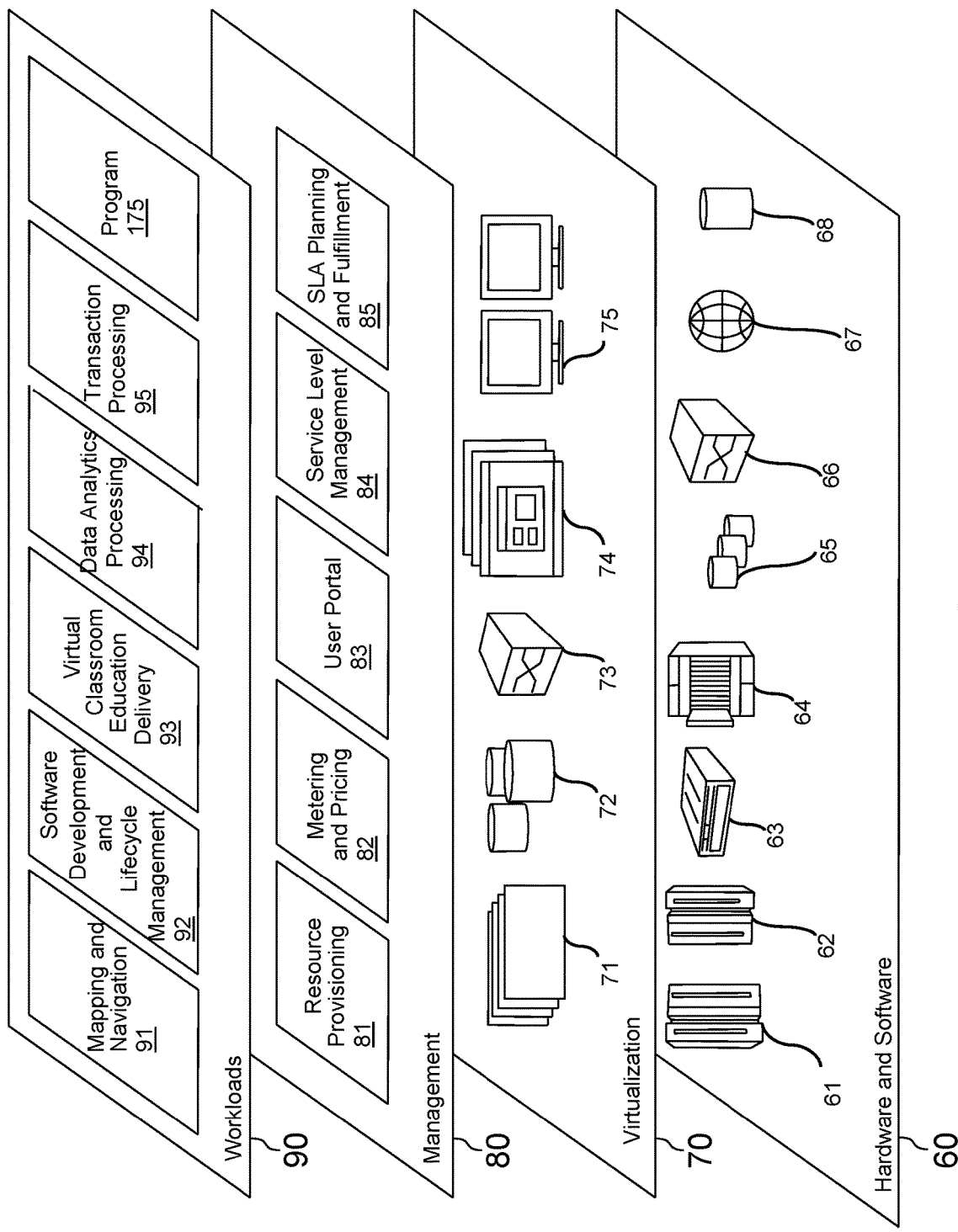
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and instruction sequencing program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for scheduling processor instructions, the method comprising:
    fetching a set of program instructions;
    selecting, by one or more computer processors, a group of instructions having a program order for reordering from the set of program instructions;
    analyzing the group of instructions;
    adding additional information to the group of instructions according to the analysis;
    reordering, by one or more computer processors, the group of instructions according to the additional information;
    assigning, by one or more computer processors, sequential ITAGs (instruction tags) to the reordered group of instructions;
    tagging, by one or more computer processors, the reordered group of instructions for group completion in a completion table;
    executing the reordered group of instructions by one or more computer processors;
    receiving, by one or more computer processors, an exception for the executed reordered group of instructions;
    re-fetching, by one or more computer processors, the group of instructions; and
    executing, by one or more computer processors, the group of instructions according to the program order.

2. The computer implemented method according to claim 1, further comprising identifying, by one or more computer processors, the program instruction triggering the exception.

3. The computer implemented method according to claim 1, further comprising fusing, by one or more computer processors, program instructions having source-destination dependencies.

4. The computer implemented method according to claim 1, further comprising completing the program instructions by one or more computer processors.

5. The computer implemented method according to claim 1, further comprising renaming the program instructions by one or more computer processors.

6. The computer implemented method according to claim 1, wherein the program instruction properties are selected from the group consisting of: co-execution opportunities, source-destination dependencies, downstream structure requirements.

7. A computer program product for scheduling processor instructions, the computer program product comprising one or more computer readable storage devices and stored program instructions on the one or more computer readable storage devices, the stored program instructions comprising:
  programmed instructions for fetching a first set of program instructions;
  programmed instructions for selecting a group of instructions having a program order for reordering from the first set of program instructions;
  program instructions for analyzing the group of instructions;
  program instructions for adding additional information to the group according to the analysis;
  programmed instructions for reordering the group of instructions selected according to the additional information;
  programmed instructions for assigning sequential ITAGs to the reordered group of instructions according to the analysis;
  programmed instructions for tagging the reordered group of instructions for group completion in a completion table;
  programmed instructions for executing the reordered group of instructions;
  program instructions for receiving an exception for the executed reordered group of instruction;
  program instructions for re-fetching the group of instructions; and
  program instructions for executing the group of program instructions according to the program order.

8. The computer program product according to claim 7, the stored program instructions further comprising identifying the program instruction triggering the exception.

9. The computer program product according to claim 7, the stored program instructions further comprising programmed instructions for fusing program instructions selected having source-destination dependencies.

10. The computer program product according to claim 7, the stored program instructions further comprising completing the program instructions selected.

11. The computer program product according to claim 7, the stored program instructions further comprising programmed instructions for renaming the program instructions selected.

12. The computer program product according to claim 7, wherein the program instruction properties are selected from the group consisting of: co-execution opportunities, source-destination dependencies, and downstream structure requirements.

13. A computer system for scheduling processor instructions, the computer system comprising:
  one or more computer processors;
  one or more computer readable storage devices;
  stored program instructions on the one or more computer readable storage devices for execution by the at least on computer processor, the stored program instructions comprising:
    programmed instructions for fetching a first set of program instructions;
    programmed instructions for selecting a group of instructions having a program order for reordering from the first set of program instructions;
    program instructions for analyzing the group of instructions;
    program instructions for adding additional information to the group according to the analysis;
    programmed instructions for reordering the group of instructions selected according to the additional information;
    programmed instructions for assigning sequential ITAGs to the reordered group of instructions according to the analysis;
    programmed instructions for tagging the reordered group of instructions for group completion in a completion table;
    programmed instructions for executing the reordered group of instructions;
    program instructions for receiving an exception for the executed reordered group of instruction;
    program instructions for re-fetching the group of instructions; and
    program instructions for executing the group of program instructions according to the program order.

14. The computer system according to claim 13, the stored program instructions further comprising identifying the program instruction triggering the exception.

15. The computer system according to claim 13, the stored program instructions further comprising programmed instructions for fusing program instructions selected having source-destination dependencies.

16. The computer system according to claim 13, the stored program instructions further comprising programmed instructions for completing the program instructions selected.

17. The computer system according to claim 13, the stored program instructions further comprising programmed instructions for renaming the program instructions selected.

* * * * *